US010859149B2

(12) United States Patent
Civiero (10) Patent No.: US 10,859,149 B2
(45) Date of Patent: Dec. 8, 2020

(54) TOOTHED CROWN FOR A BICYCLE CRANKSET (71) Applicant: Campagnolo S.r.l., Vicenza (IT)

(72) Inventor: Mirco Civiero, Montecchia di Crosara (IT)

(73) Assignee: Campagnolo S.r.l., Vicenza (IT)

( * ) Notice: Subject to any disclaimer, the term of this patent is extended or adjusted under 35 U.S.C. 154(b) by 337 days.

(21) Appl. No.: 15/982,366

(22) Filed: May 17, 2018

(65) Prior Publication Data
US 2018/0335123 A1    Nov. 22, 2018

(30) Foreign Application Priority Data

May 22, 2017    (IT) .......................... 102017000054982

(51) Int. Cl.
*F16H 55/30* (2006.01)
*B62M 9/00* (2006.01)
*B62M 9/10* (2006.01)
*B62M 9/02* (2006.01)

(52) U.S. Cl.
CPC ............... *F16H 55/30* (2013.01); *B62M 9/00* (2013.01); *B62M 9/02* (2013.01); *B62M 9/105* (2013.01)

(58) Field of Classification Search
CPC .......... B62M 9/105; B62M 9/10; B62M 9/02; B62M 9/04; F16H 55/30
USPC ......................................................... 474/160
See application file for complete search history.

(56) References Cited

U.S. PATENT DOCUMENTS

| 4,384,865 | A | * | 5/1983 | Ueno | ....................... B62M 9/10 474/160 |
| 4,439,172 | A | * | 3/1984 | Segawa | .................. B62M 9/105 474/144 |
| 9,062,758 | B2 | | 6/2015 | Reiter | |
| 2002/0028719 | A1 | * | 3/2002 | Yamanaka | ............... B62M 3/00 474/160 |
| 2002/0086753 | A1 | * | 7/2002 | Yahata | .................... B62M 9/105 474/160 |
| 2004/0009838 | A1 | * | 1/2004 | Valle | ...................... B62M 9/105 474/160 |

(Continued)

FOREIGN PATENT DOCUMENTS

JP    H0740387 U    7/1995

OTHER PUBLICATIONS

Italian Search Report and Written Opinion in Italian Application No. 102017000054982, dated Feb. 8, 2018, with English translation.

*Primary Examiner* — Michael R Mansen
*Assistant Examiner* — Raveen J Dias
(74) *Attorney, Agent, or Firm* — Volpe Koenig (57) ABSTRACT A bicycle crankset annular body with a toothed crown that extends about a rotation axis and has axially inner and outer surfaces and a reference plane (R) on which the rotation axis (O) and a longitudinal axis of a right crank arm lies. The annular body's maximum axial thickness, defined at a first angular portion, is between two parallel planes that are orthogonal to the reference plane (R). The angular portion has a lightening recess formed on the axially outer surface between two delimiting planes that pass through the rotation axis (O) and are inclined with respect to the reference plane (R) by first and second angles which are measured on axially outer surface moving angularly in the clockwise direction from the reference plane (R).

20 Claims, 10 Drawing Sheets (56) References Cited

U.S. PATENT DOCUMENTS

| | | | |
|---|---|---|---|
| 2007/0129193 A1* | 6/2007 | Nonoshita | B62M 9/105 474/160 |
| 2008/0028887 A1* | 2/2008 | Valle | B62M 9/105 74/594.1 |
| 2008/0202284 A1* | 8/2008 | Valle | B62M 9/105 74/594.1 |
| 2013/0233127 A1* | 9/2013 | De Pretto | B62M 9/105 74/594.2 |
| 2014/0047946 A1 | 2/2014 | Valle et al. | |
| 2015/0239528 A1* | 8/2015 | Barefoot | B62M 9/00 474/152 |
| 2015/0307156 A1* | 10/2015 | Earle | F16H 55/30 474/142 |
| 2016/0208903 A1* | 7/2016 | Goates | B62M 9/105 |
| 2016/0238122 A1* | 8/2016 | Medaglia | F16H 55/12 |
| 2016/0280325 A1 | 9/2016 | Watarai et al. | |
| 2018/0031105 A1* | 2/2018 | Wickliffe | F16H 55/303 |
| 2018/0274651 A1* | 9/2018 | Gerhardt | B62M 3/00 |

* cited by examiner

TOOTHED CROWN FOR A BICYCLE CRANKSET

CROSS REFERENCE TO RELATED APPLICATION

This application claims the benefit of Italian Patent Application No. 102017000054982, filed May 22, 2017, which is incorporated by reference as if fully set forth.

FIELD OF INVENTION

The present invention refers to a toothed crown for a bicycle crankset, as well as to a bicycle crankset comprising such a toothed crown.

As known, in order to transfer the torque supplied by the cyclist by pedaling from the bottom bracket of the bicycle to the rear wheel, the bicycles comprise a crankset mounted on the shaft of the bottom bracket and a sprocket assembly mounted on the hub of the rear wheel of the bicycle. The crankset comprises a toothed crown coupled with the right crank arm of the bicycle and on which the chain of the bicycle is intended to be engaged, the chain also being engaged on a sprocket of the aforementioned sprocket assembly.

In the field of bicycles, particularly of racing bicycles, there is a need to make components that are as light as possible without penalizing the structural strength thereof. Such a requirement is also taken into consideration in the design of the toothed crowns of the cranksets.

BACKGROUND

In the present description and in the following claims, the terms "axially inner" and "axially outer" refer to a direction parallel to the rotation axis of the toothed crown (which coincides with the rotation axis of the shaft of the bicycle bottom bracket) and to a direction facing towards the bicycle frame and on the opposite side to the bicycle frame, respectively. Therefore, an axially inner surface of the toothed crown is the one facing towards the bicycle frame, whereas an axially outer surface of the toothed crown is the one facing towards the right crank arm.

In the present description and in the following claims, the expression "lightening recess" is used to indicate a portion of toothed crown characterized by a significant reduction in axial thickness with respect to the adjacent portions of toothed crown. The expression "thickened portions", on the other hand, is used to indicate a portion of toothed crown characterized by a significant increase in axial thickness with respect to the adjacent portions of toothed crown.

U.S. Pat. No. 9,062,758 discloses a toothed crown that is indicated with reference numeral 10 and is shown in the prior art FIG. 1. The toothed crown 10 comprises an annular body 11 having an axially inner surface 12 and an axially outer surface 14. In a radially outer position with respect to the annular body 11 there is a plurality of teeth, whereas in a radially inner position with respect to the annular body 11 there is a plurality of coupling portions 16 for coupling with the right crank arm.

Figure 1:
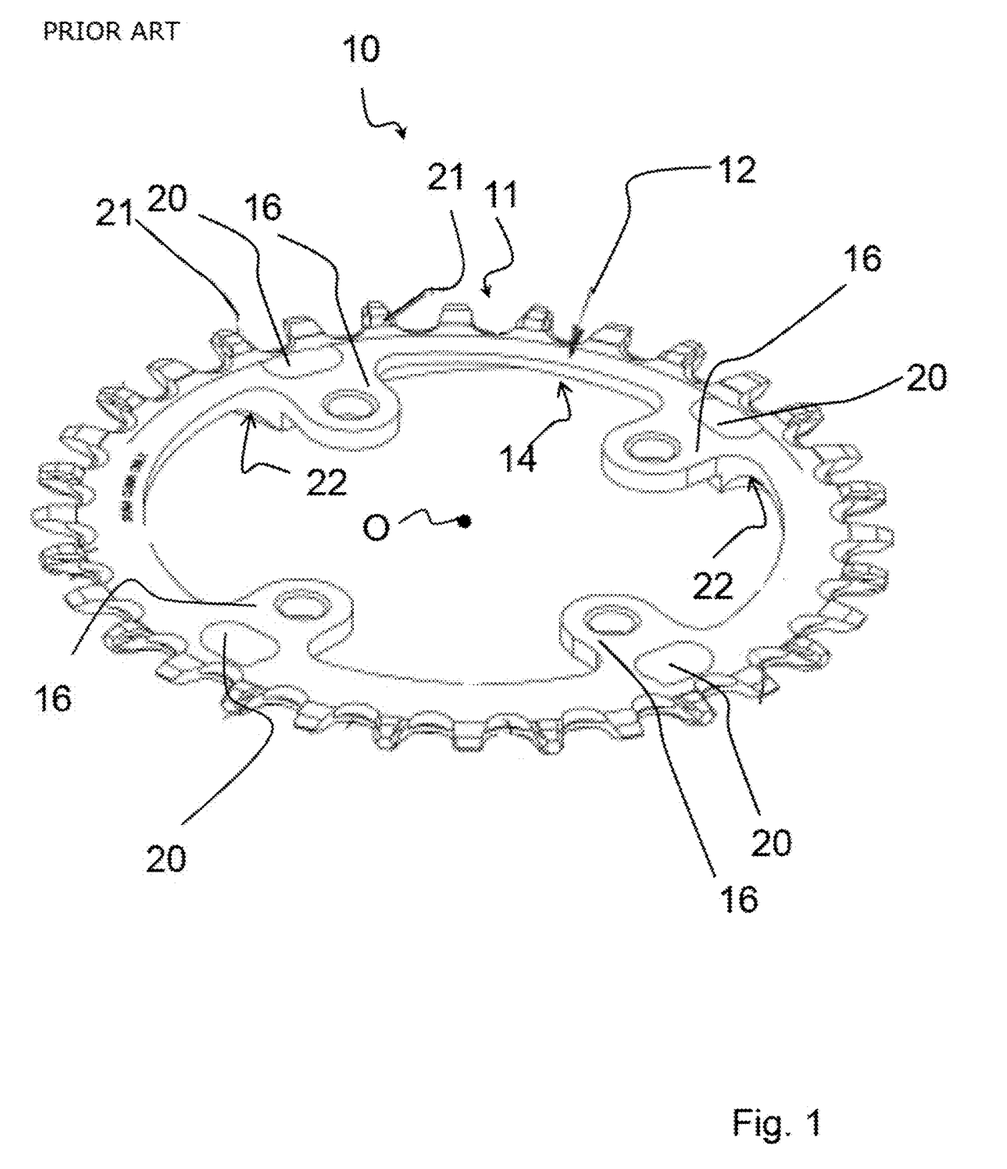
FIG. 1 is a schematic rear perspective view of a toothed crown for a bicycle crankset in accordance with the prior art.

The aforementioned plurality of teeth comprises a first group of teeth having identical shape and size and a second group of teeth having identical shape and size but different shape and size from those of the first group of teeth, each tooth of the second group of teeth being interposed between two consecutive teeth of the first group of teeth.

At each coupling portion 16 the annular body 11 comprises, on the axially inner surface 12 thereof, a respective lightening recess 20, and on the axially outer surface 14 thereof, a respective thickened portion 22.

The thickened portions 22 define the maximum axial thickness of the annular body 11.

In order to further reduce the weight of the toothed crown 10, undercut portions 21 are provided on one of the two opposite faces of the toothed crown 10 and at the radially innermost areas of the teeth of one of the aforementioned two groups of teeth. In FIG. 1 the undercut portions 21 are on the axially inner face of the teeth.

The Applicant has observed that the toothed crown 10 of FIG. 1 has the aforementioned thickened portions 22 precisely at the areas of the toothed crown 10 which are most stressed by the torque transmitted by the right crank arm. The provision of such thickened portions 22 results in a significant worsening of weight, which is only partially compensated by the provision of the lightening recesses 20 and, to an even lesser extent, by the provision of the undercut portions 21.

The Applicant has observed that it is appropriate that the design of the toothed crowns, particularly of those of racing bicycles, is carried out taking in due consideration not only the requirements of lightness and the structural resistance of the toothed crown to the stresses imparted by the right crank arm during pedaling, but also the structural resistance of the teeth of the toothed crown to the stresses imparted by the chain.

In this context, the Applicant has thought to analyze the axial deformations which the toothed crown is subjected to in the condition in which the component of the load imparted by the cyclist on the right crank arm useful for the rotation of the toothed crown (hereinafter "useful component of the force applied to the right crank arm") is maximum during pedaling and has found that, in specific reference operating conditions, like for example climbing standing up, climbing sitting down and starting from a stop (the latter being a condition that always occurs), such a useful component of the force applied to the right crank arm is maximum when the right crank arm reaches predetermined rotation angles with respect to a reference position in which the longitudinal axis of the stem of the right crank arm is vertical and extend upwards.

The Applicant has thus paid particular attention to the deformation of the toothed crown at the portions of the toothed crown that are most stressed by the chain when the right crank arm is positioned at the aforementioned predetermined rotation angles, one of these portions being the one at which the engagement of the toothed crown with the chain of the bicycle starts.

The Applicant has identified that, for example in the operating condition of "starting from a stop", the angular portion of the toothed crown most stressed by the chain when the useful component of the force applied to the right crank arm is maximum is the one defined between two planes that are angularly inclined with respect to the right crank arm by a predetermined angle, measured on the axially outer surface of the toothed crown, comprised between about 100° and about 160°, more preferably between about 107° and about 159°, moving from the longitudinal axis of the right crank arm in a counter-clockwise direction.

The Applicant has found that it is possible to form lightening recesses on the annular body of the toothed crown also at the aforementioned portions of the toothed crown most stressed by the chain in the aforementioned conditions of maximum stress imparted on the right crank arm, without for this reason jeopardizing the structural resistance of the toothed crown both to the stresses imparted by the right crank arm and to those imparted by the chain. In this way, it is possible to reduce the weight of the toothed crown whilst still keeping the desired structural strength.

SUMMARY

The present invention therefore relates, in a first aspect thereof, to a toothed crown for a bicycle crankset, comprising an annular body extending about a rotation axis, a plurality of teeth that extend from said annular body along respective radially outer directions and a plurality of coupling portions for coupling with a bicycle right crank arm that extend from said annular body on the opposite side to said plurality of teeth, said annular body comprising:
   an axially inner surface;
   an axially outer surface;
   a reference plane on which said rotation axis lies and a longitudinal axis of said right crank arm is intended to lie when said right crank arm is coupled with said annular body at said plurality of coupling portions and at said axially outer surface;
   the annular body having a maximum axial thickness equal to the distance between two main planes parallel to each other and orthogonal to said reference plane, said maximum axial thickness being defined at at least one first angular portion of said annular body;
   said toothed crown being characterized in that said at least one first angular portion of said annular body comprises a first lightening recess formed on said axially outer surface, wherein said at least one first angular portion extends circumferentially between two delimiting planes passing through said rotation axis and inclined with respect to said reference plane respectively by a first angle comprised between about 21° and about 27°, the extreme values being included, and by a second angle comprised between about 67° and about 73°, the extreme values being included, wherein said first angle and second angle are measured on said axially outer surface moving angularly in a clockwise direction from said reference plane.

The Applicant has surprisingly found that the provision of a lightening recess on such an angular portion of the annular body does not jeopardize the structural strength of the toothed crown. Instead it allows to achieve a considerable reduction in weight. Having considered that it possible to lighten the toothed crown at a greatly stressed area thereof, the Applicant deems that it is possible to do so in other less stressed areas of the toothed crown, in such a way achieving a further reduction in weight.

Preferably, the at least one first angular portion is free from lightening recesses on said axially inner surface, so as not to penalize the structural strength of the toothed crown.

BRIEF DESCRIPTION OF THE DRAWINGS

The features and advantages of the present invention will become clearer from the following description of a preferred embodiment thereof, made hereinafter, for indicating and not limiting purposes, with reference to the attached drawings. In such drawings.

DETAILED DESCRIPTION OF THE PREFERRED EMBODIMENTS

In preferred embodiments of the toothed crown of the present invention, a second angular portion of said annular body comprises a second lightening recess formed on said axially outer surface. Preferably, said second angular portion is diametrically opposite to said at least one first angular portion with respect to said rotation axis.

The second angular portion is thus substantially offset by 180° with respect to the first angular portion. Since the chain of the bicycle engages the toothed crown for an angular extension of about 180°, the second lightening recess is formed, on the axially outer surface of the annular body, at the other of the angular portions of the toothed crown most stressed by the chain during pedaling, such other angular portion being the one at which the engagement of the toothed crown with the chain of the bicycle ends when the right crank arm is in the aforementioned position of maximum stress.

Preferably, said second angular portion is free from lightening recesses on said axially inner surface, so as not to penalize the structural strength of the toothed crown.

The number of teeth of the toothed crown of the present invention is preferably comprised between 28 and 44, the extreme values being included.

In preferred embodiments of the invention, the toothed crown has for example 32 or 34 teeth.

Preferably, a first tooth is arranged substantially astride of (or in close proximity to) said reference plane, a thirteenth tooth and a twenty-ninth tooth are arranged between said two delimiting planes, the thirteenth and the twenty-ninth tooth being counted on said axially outer surface moving circumferentially in a counter-clockwise direction from said first tooth.

In preferred embodiments of the toothed crown of the present invention, said plurality of coupling portions comprises two pairs of coupling portions symmetrically arranged on opposite sides with respect to said reference plane.

Preferably, each of the aforementioned coupling portions extends from said annular body along a respective radially inner direction.

Preferably, a first coupling portion of a first pair of said two pairs of coupling portions is arranged at said at least one first angular portion.

More preferably, a first coupling portion of a second pair of said two pairs of coupling portions is arranged at said second angular portion.

Even more preferably, the annular body comprises, at a second coupling portion of said first pair of said two pairs of coupling portions and at a second coupling portion of said second pair of said two pairs of coupling portions, a third and a fourth lightening recess, respectively, formed on said axially outer surface.

Therefore, in this embodiment of the toothed crown of the invention, each coupling portion thus has a respective lightening recess formed on said axially outer surface.

Preferably, the annular body comprises, at a second coupling portion of said first pair of said two pairs of coupling portions and at a second coupling portion of said second pair of said two pairs of coupling portions, a fifth and a sixth lightening recess, respectively, formed on said axially inner surface. Advantageously, such lightening recesses face the frame and do not alter the aesthetic appearance of the toothed crown visible from the outside.

Preferably, each of said fifth and sixth lightening recesses comprises a first recess portion arranged in a radially outer position with respect to the respective coupling portion and a second recess portion that extends from said first recess portion towards the first coupling portion of the respective pair of said two pairs of coupling portions.

More preferably, said second recess portion has a radial extension shorter than that of said first recess portion.

Even more preferably, said second recess portion has a axial depth smaller than that of said first recess portion.

In preferred embodiments of the toothed crown of the present invention, the annular body comprises a plurality of depressions formed on said axially outer surface.

Advantageously, such depressions are shaped so as to provide the axially outer surface of the toothed crown also with an aesthetic characterization.

Preferably, each of said depressions is arranged between two respective circumferentially consecutive coupling portions.

More preferably, each of said depressions extends asymmetrically with respect to a radial plane angularly equidistant from said two circumferentially consecutive coupling portions.

In a second aspect thereof, the invention relates to a bicycle crankset comprising a right crank arm and a toothed crown coupled with the right crank arm, wherein said toothed crown is made according to the first aspect of the invention.

Figure 4:
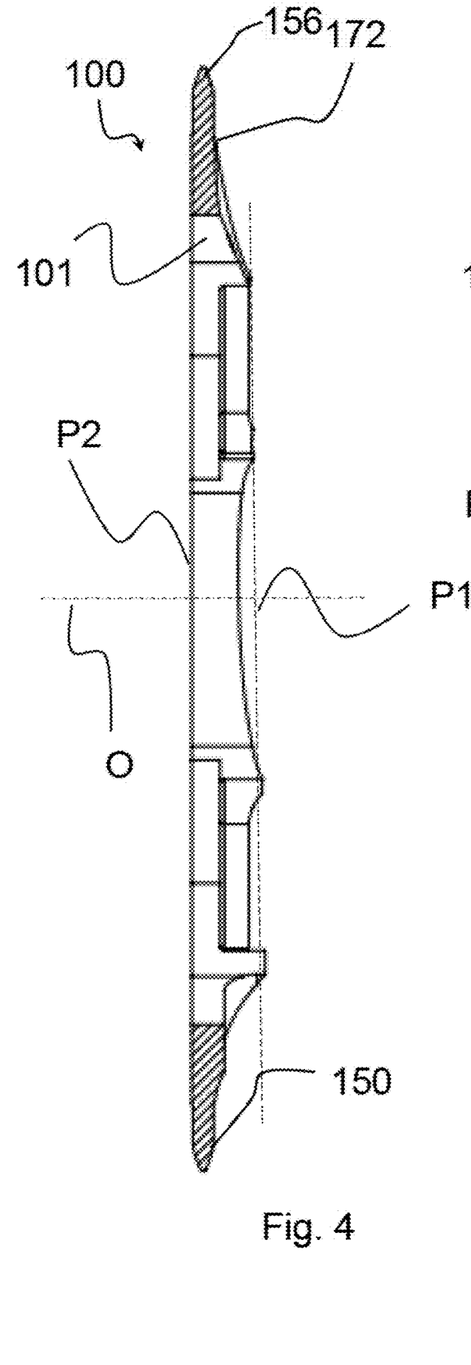
FIG. 4 is a schematic diametral section view of the toothed crown of FIG. 2, taken according to the plane line IV-IV of FIG. 2.
Figure 5:
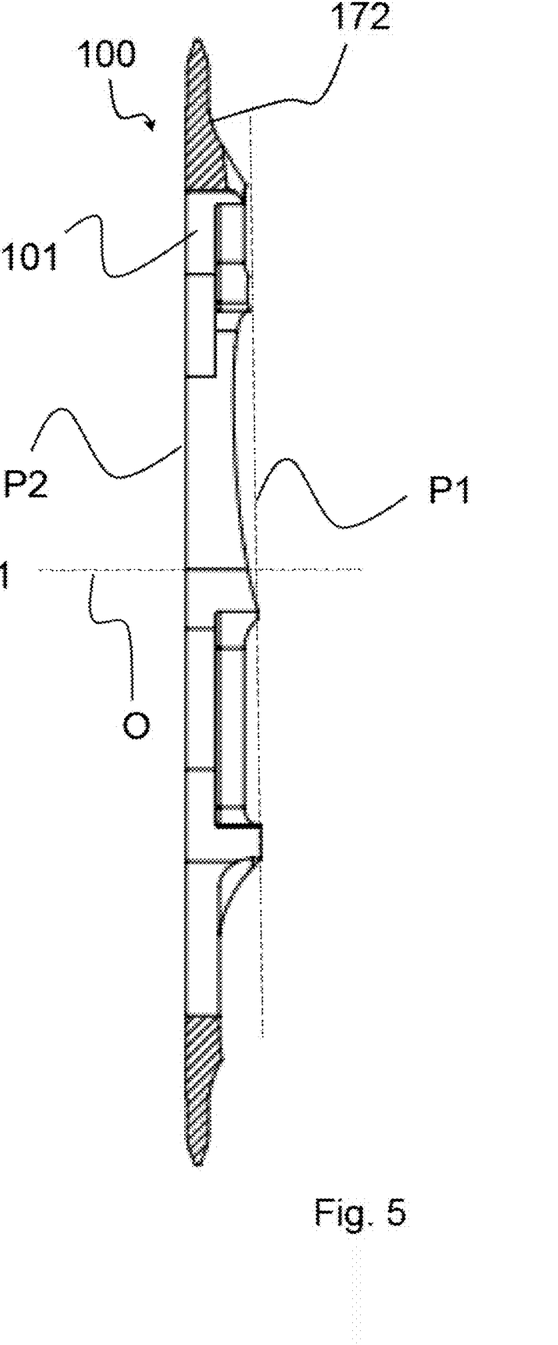
FIG. 5 is a further schematic diametral section view of the toothed crown of FIG. 2, taken according to the plane line V-V of FIG. 2.
Figure 6:
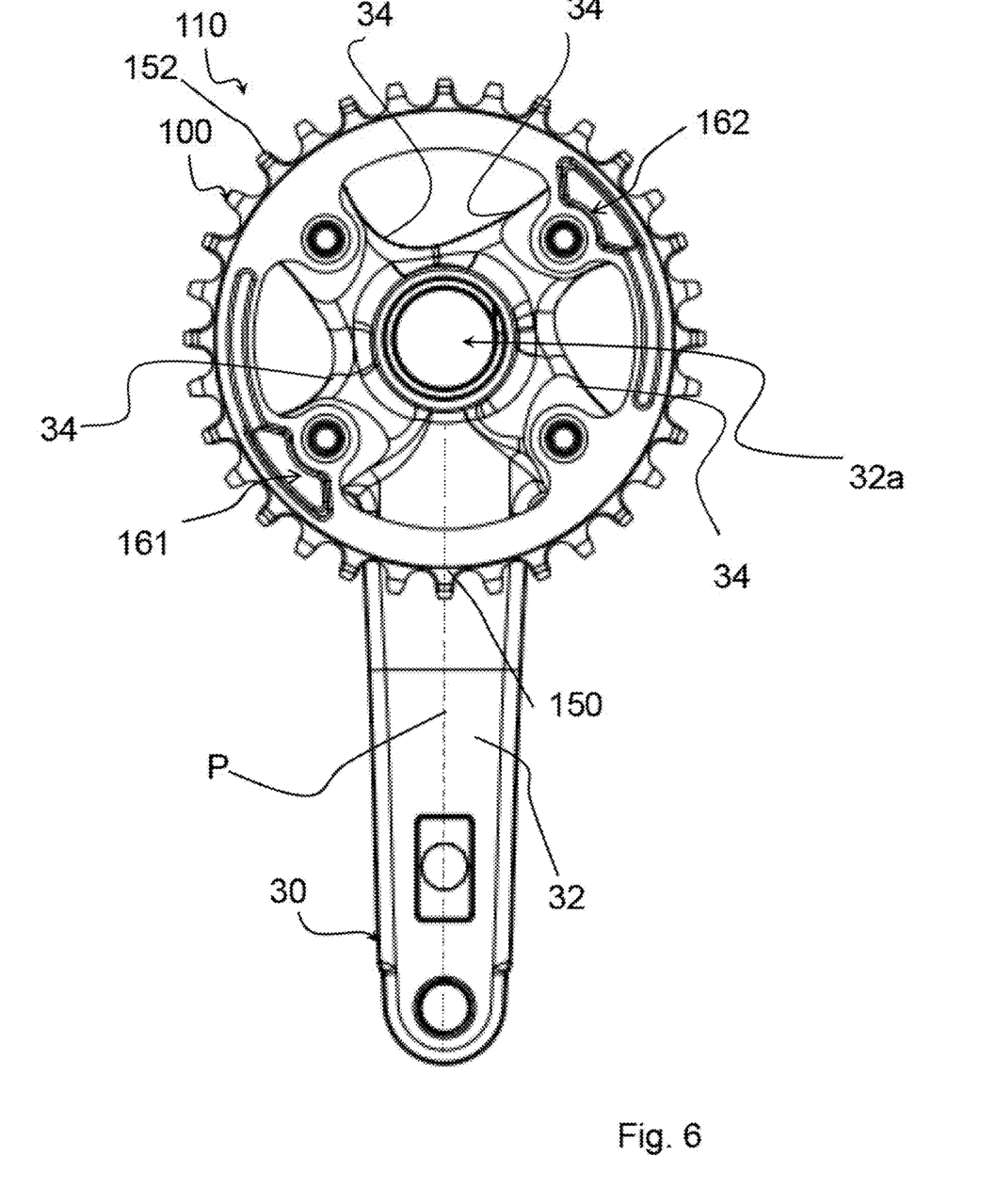
FIG. 6 is a schematic rear view of a bicycle crankset in accordance with the invention, comprising the toothed crown of FIG. 2.

With reference now to FIGS. 2-6, 7a and 7b, reference numeral 100 globally indicates a first preferred embodiment of a toothed crown for a bicycle crankset in accordance with the invention. The bicycle crankset is globally indicated with reference numeral 110 (FIG. 6).

The toothed crown 100 of the non-limiting example of FIGS. 2-6, 7a and 7b comprises an annular body 101 extending about a rotation axis O.

The toothed crown 100 further comprises a plurality of teeth 111 (in the example of the aforementioned figures the teeth 111 are 32) arranged in a radially outer position with respect to the annular body 101. In particular, the teeth 111 extend from the annular body 101 outwards along respective radial directions.

The toothed crown 100 also comprises four coupling portions 160a', 160a", 160b', 160b" for coupling with a right crank arm 30 (FIG. 6). Such coupling portions 160a', 160a", 160b', 160b" extend from the annular body 101 on the opposite side to the plurality of teeth 111, i.e. in a radially inner direction with respect to the annular body 101. In the non-limiting example illustrated, the coupling portions 160a', 160a", 160b', 160b" extend from the annular body 101 radially towards the rotation axis O.

With reference to FIG. 6, the right crank arm 30 comprises a stem 32 extending along a longitudinal axis P. A hole 32a for coupling the right crank arm 30 with the shaft of the bottom bracket of the bicycle is formed on the stem 32.

Four coupling elements 34 extend radially outwards from the hole 32a of the right crank arm 30 to couple with the coupling portions 160a', 160a", 160b', 160b" of the toothed crown 100.

Figure 2:
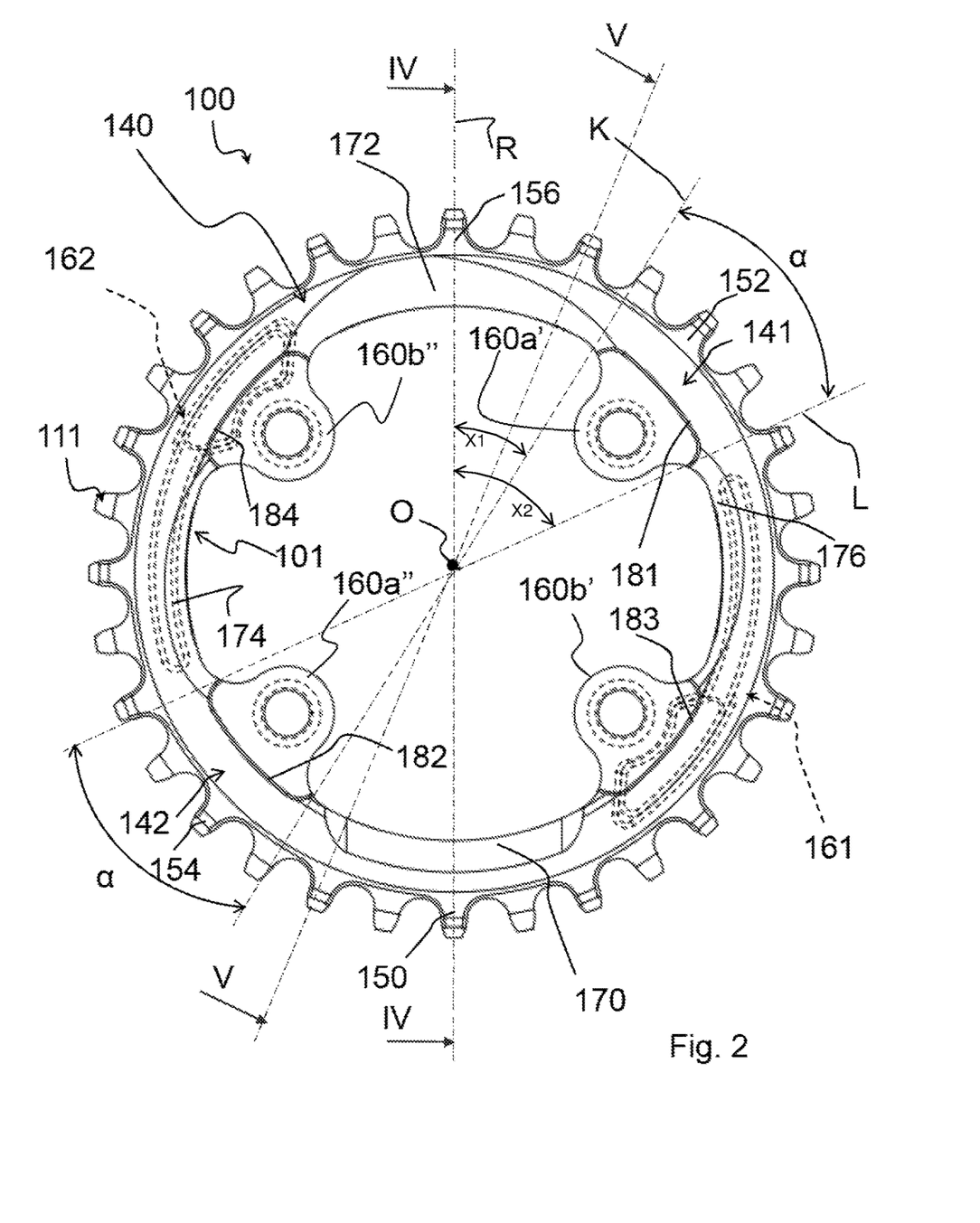
FIG. 2 is a schematic front view of a toothed crown for a bicycle crankset in accordance with a first preferred embodiment of the invention.
Figure 3:
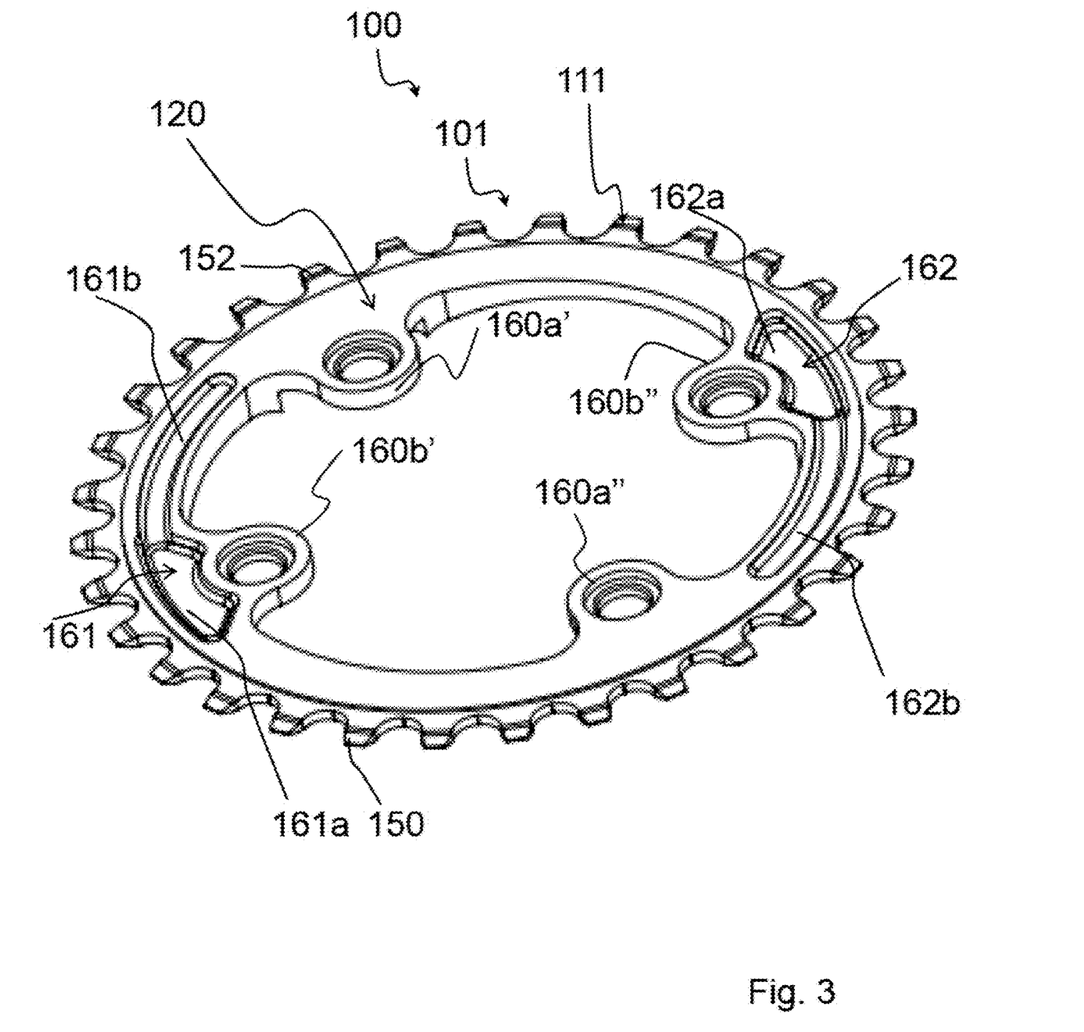
FIG. 3 is a schematic rear perspective view of the toothed crown of FIG. 2.

The annular body 101 of the toothed crown 100 comprises an axially inner surface 120 and an axially outer surface 140.

The right crank arm 30 is intended to couple with the axially outer surface 140 of the annular body 101 (at the four coupling portions 160a', 160a", 160b', 160b").

A reference plane R, see FIG. 2, on which the rotation axis O lies, is defined in the annular body 101.

Once the right crank arm 30 is coupled with the toothed crown 100, the longitudinal axis P of the right crank arm 30 also lies on the reference plane R.

A pair of first coupling portions 160a', 160b' is arranged on one side with respect to the reference plane R, whereas a pair of second coupling portions 160a", 160b" is arranged on the opposite side with respect to the reference plane R symmetrically to the pair of first coupling portions 160a', 160b'.

The second coupling portions 160a", 160b" are diametrically opposite to the first coupling portions 160a', 160b' with respect to the rotation axis O.

With reference to FIGS. 4 and 5, the annular body 101 has a maximum axial thickness equal to the distance between two main planes, P1 and P2, which are parallel to each other and both orthogonal to the reference plane R (and therefore to the rotation axis O).

The maximum axial thickness of the annular body 101 is defined at a first angular portion 141 of the annular body 101 and, preferably, at a second angular portion 142 of the annular body 101. The second angular portion 142 is diametrically opposite to the first angular portion 141 with respect to the rotation axis O, and thus it is substantially offset by 180° with respect to the first angular portion 141.

Figure 10:
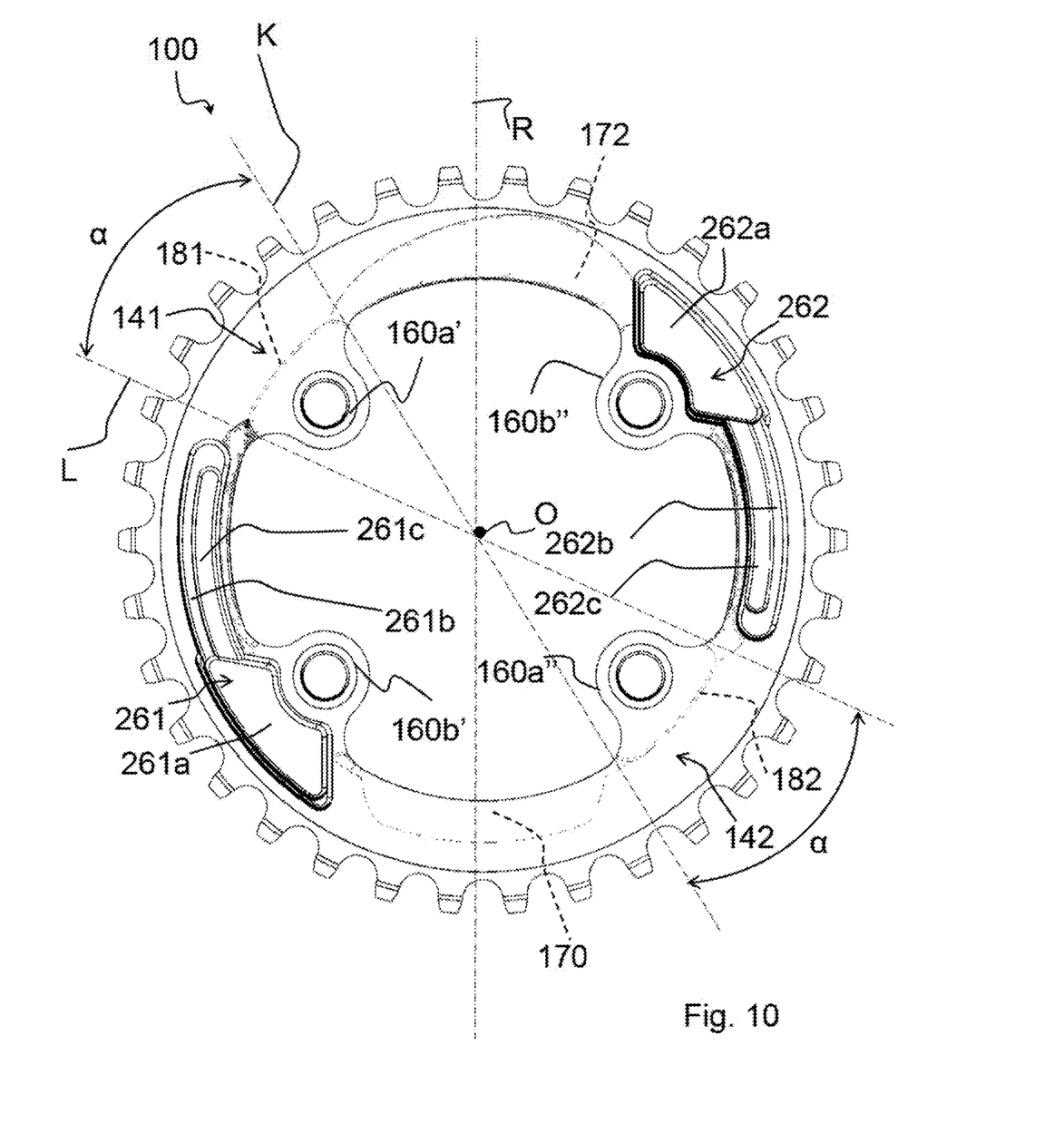
FIG. 10 is a schematic rear view of a toothed crown for a bicycle crankset in accordance with a second preferred embodiment of the invention.

The first angular portion 141 and the second annular angular portion 142 of the annular body 101 respectively comprise a first lightening recess 181 and a second lightening recess 182, see FIGS. 2 and 10, both formed on the axially outer surface 140 and, preferably, the identical to each other.

The first angular portion 141 and the second annular angular portion 142 of the annular body 101 are, on the other hand, free from lightening recesses on the axially inner surface 120.

The first angular portion 141 and the second angular portion 142 extend circumferentially between two delimiting planes K and L passing through the rotation axis O and inclined with respect to the reference plane R by a first angle (X1) comprised between about 21° and about 27°, the extreme values being included, and by a second angle (X2)

comprised between about 67° and about 73°, the extreme values being included, respectively.

The aforementioned first angle (X1) and second angle (X2) are measured on the axially outer surface 140 moving angularly in the clockwise direction from the reference plane R, see FIG. 2.

For example, in the embodiment illustrated in FIGS. 2-6, 7a and 7b, the aforementioned first angle (X1) can be equal to about 25° and the aforementioned second angle (X2) can be an angle equal to about 70°.

The two delimiting planes K and L therefore define an angle α between them comprised between about 40° and about 52°, the extreme values being included.

The first angular portion 141 is arranged at the coupling portion 160a' and the second angular portion 142 is arranged at the coupling portion 160a".

In the example of FIGS. 2-6, 7a and 7b, a first tooth 150 of the toothed crown 100 is arranged substantially astride of the reference plane R, whereas a thirteenth tooth 152 and a twenty-ninth tooth 154, counted on the axially outer surface 140 moving circumferentially in the counter-clockwise direction from the first tooth 150, are arranged between the two delimiting planes K and L in the aforementioned first angular portion 141 and in the aforementioned second angular portion 142, respectively.

The annular body 101 comprises, at the coupling portions 160b' and 160b", respectively a third lightening recess 183 and a fourth lightening recess 184, both formed on the axially outer surface 140 and, preferably, identical to each other.

The aforementioned lightening recesses 183, 184 are preferably substantially identical to the lightening recesses 181, 182.

Fifth lightening recesses 161 are made on the axially inner surface 120 of the annular body 101 at the coupling portion 160b' and at the portion of annular body 101 arranged between the aforementioned coupling portion 160b' and the coupling portion 160a'.

Sixth lightening recesses 162 are further made on the axially inner surface 120 of the annular body 101 at the coupling portion 160b" and at the portion of annular body 101 arranged between the aforementioned coupling portion 160b" and the coupling portion 160a".

Each of the aforementioned fifth and sixth lightening recesses 161, 162 comprises, in particular, a first recess portion 161a, 162a arranged in radially outer position with respect to the respective coupling portion 160b', 160b" and a second recess portion 161b, 162b that extends from the first recess portion 161a, 162a towards the other coupling portion 160a', 160a" of the respective pair of coupling portions 160a', 160a", 160b', 160b".

In the non-limiting example illustrated, the second recess portion 161b, 162b has a radial extension shorter than that of the first recess portion 161a, 162a.

Furthermore, the second recess portion 161b, 162b has a axial depth shorter than that of the first recess portion 161a, 162a.

Preferably, the lightening recesses 181, 182, 183, 184 and, more preferably also the lightening recesses 161, 162 are obtained through a turning process.

In the non-limiting example illustrated, the crown 100 also comprises depressions 172, 174, 176 made on the axially outer surface 140 of the annular body 101.

Such depressions 172, 174, 176 are preferably obtained through a forging process and have a depth of a few millimeters, for example 0.2 mm. Preferably, the depth of the depressions 172, 174, 176 is less than that of the aforementioned lightening recesses 181, 182, 183, 184, 161, 162.

The depression 172 is arranged between the coupling portions 160a' and 160b" and extends astride of the reference plane R asymmetrically. In particular, the depression 172 has a radial width that increases moving from the coupling portion 160a' to the coupling portion 160b" in a counter-clockwise direction up to beyond the reference plane R, to then progressively decrease as the coupling portion 160b" is approached.

Preferably, the radial width of the depression 172 at the coupling portion 160a' is greater than that at the coupling portion 160b".

The depressions 174 and 176 are respectively arranged between the coupling portions 160a" and 160b" and between the coupling portions 160a' and 160b'. Preferably, such depressions 174 and 176 have a substantially identical shape and are arranged symmetrically with respect to the reference plane R and upside down with respect to one another (FIG. 2).

The depressions 174 and 176 are asymmetrical with respect to a radial plane angularly equidistant from the two circumferentially consecutive coupling portions 160a" and 160b" and from the two circumferentially consecutive coupling portions 160a' and 160b', respectively. In particular, the depression 174 has a radial width that increases moving from the coupling portion 160b" to the coupling portion 160a" in a counter-clockwise direction, whereas the depression 176 has a radial width that increases moving from the coupling portion 160b' to the coupling portion 160a' in a counter-clockwise direction.

The depressions 172, 174 and 176 are three-dimensionally shaped so as to provide the axially outer surface 140 with an aesthetic and distinctive value, as illustrated in FIGS. 2, 4 and 5.

On the axially outer surface 140 of the annular body 101 a recess 170 is also formed, which extends symmetrically astride of the reference plane R on the diametrically opposite side to the depression 172, with respect to the rotation axis O. The recess 170 is configured to house a portion of the stem 32 of the right crank arm 30.

The recess 170 is arranged at the first tooth 150 of the toothed crown 100, whereas the depression 172 is arranged at the seventeenth tooth 156 of the toothed crown 100, counted on the axially outer surface 140 moving circumferentially in a counter-clockwise direction from the first tooth 150.

Preferably, the recess 170 is obtained through a turning process.

Preferably, the depth of the depressions 172, 174, 176 is less than that of the aforementioned lightening recesses 181, 182, 183, 184, 161, 162.

The Applicant has identified that the first angular portion 141 is the portion of the crown 100 most stressed in specific reference operating conditions, in particular in the operating condition of starting from a stop.

Figure 7A:
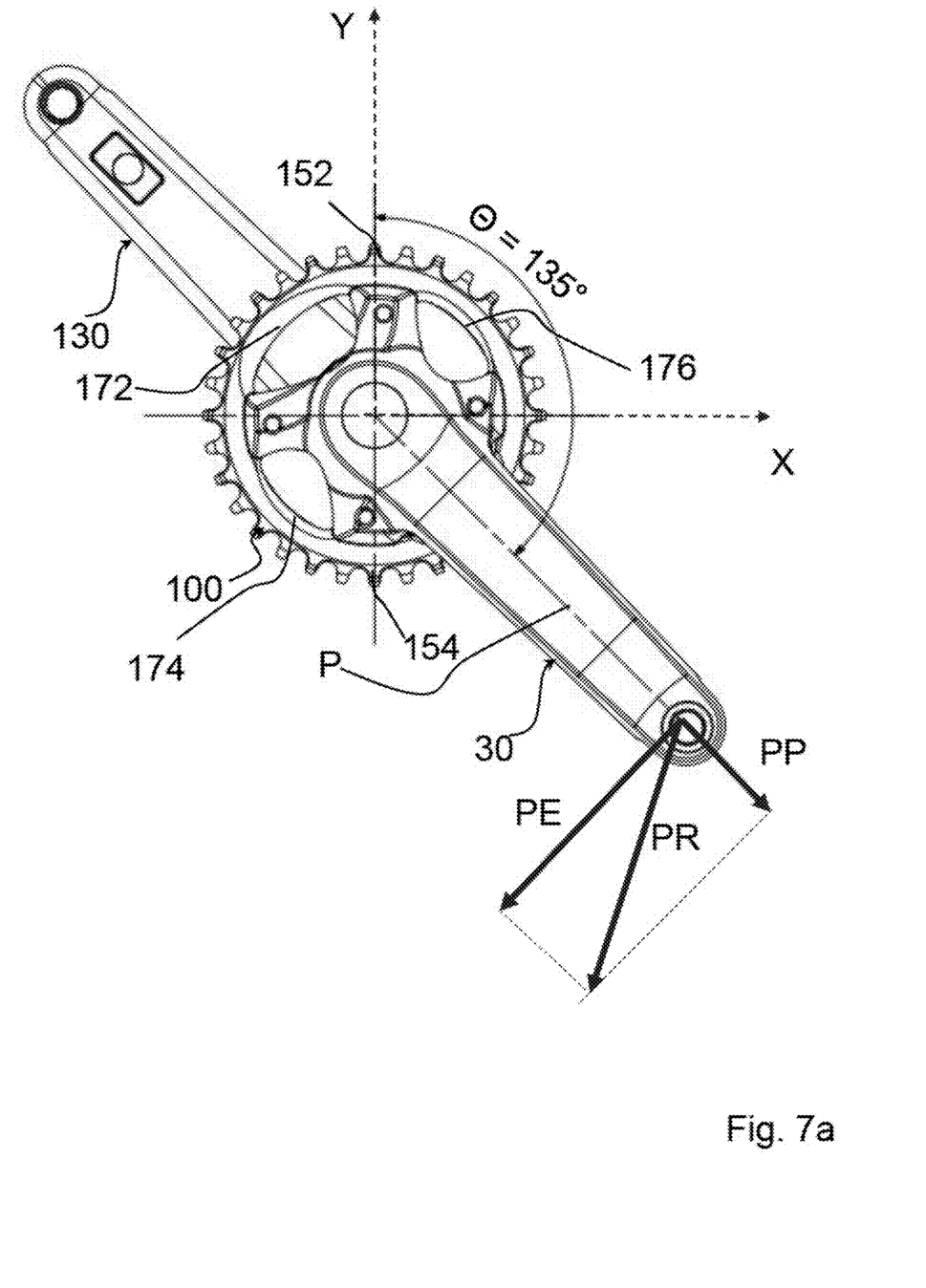
FIGS. 7a, 7b are schematic front views of the crankset of FIG. 6 coupled with a left crank arm, in two different operating positions taken up during pedaling.
Figure 7B:
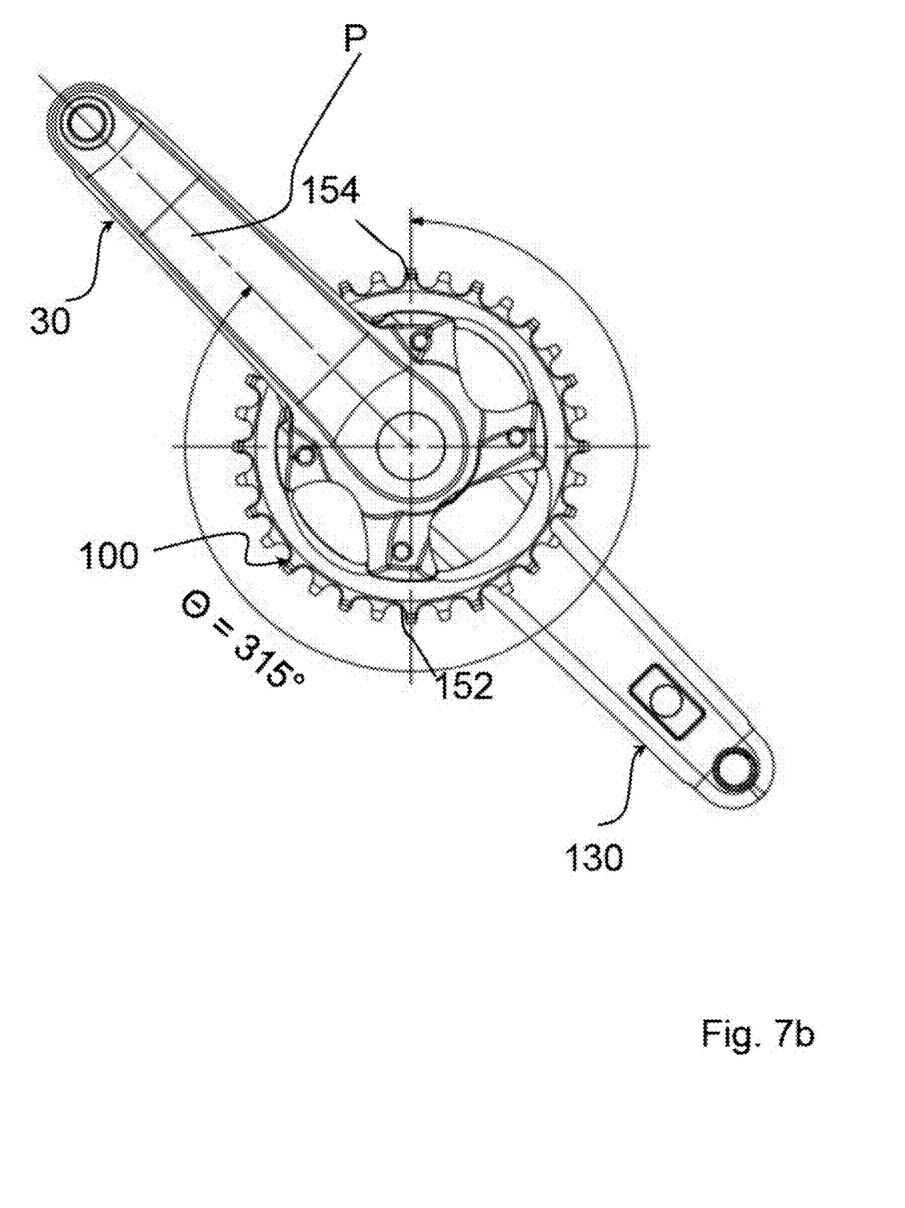

FIGS. 7a and 7b illustrate a crank arm angle θ that is defined as the angle of rotation between the position in which the stem 32 of the right crank arm 30 faces vertically upwards (θ=0°) and the position taken up by the right crank arm 30 during pedaling (clockwise direction of rotation in FIGS. 7a and 7b).

The chain of the bicycle (not illustrated) engages the toothed crown 100 for an angular extension of about 180°, whereby when the right crank arm 30 is in the operating position of FIG. 7a (in which the crank arm angle θ is equal to 135°) the teeth 111 at the first angular portion 141 of the crown 100 start to engage the chain, whereas the teeth 111 at the second angular portion 142 of the crown 100 start to disengage from the chain.

When the right crank arm 30 is in the operating position of FIG. 7b (in which the crank arm angle θ is equal to 315°) the teeth 111 at the second angular portion 142 of the crown 100 start to engage the chain, whereas the teeth 111 at the first angular portion 141 of the crown 100 start to disengage from the chain.

FIGS. 7a and 7b also illustrate a left crank arm 130 that is coupled with the right crank arm 30 and is offset with respect to the latter by 180°.

With reference to FIG. 7a, during pedaling, a resultant force PR acts on the right crank arm 30, said resultant force PR being made up of a useful component PE of the force applied to the right crank arm 30 by the cyclist (such a useful component is directed perpendicular to the longitudinal axis P of the stem 32 of the right crank arm 30 and is thus the one which carries out work and generates power during pedaling) and of an axial component PP (directed parallel to the longitudinal axis P of the stem 32 of the right crank arm 30 and that thus does not carry out work and does not generate power during pedaling).

The Applicant has carried out experimental tests to evaluate the useful component PE of the force applied to the right crank arm 30 as a function of the crank arm angle θ, in five reference operating conditions:
"climb standing up" with gear ratio 52/12;
"climb standing up" with gear ratio 52/25;
"climb sat down" with gear ratio 39/25;
"climb sat down" with gear ratio 52/19;
"starting from a stop".

Figure 8:
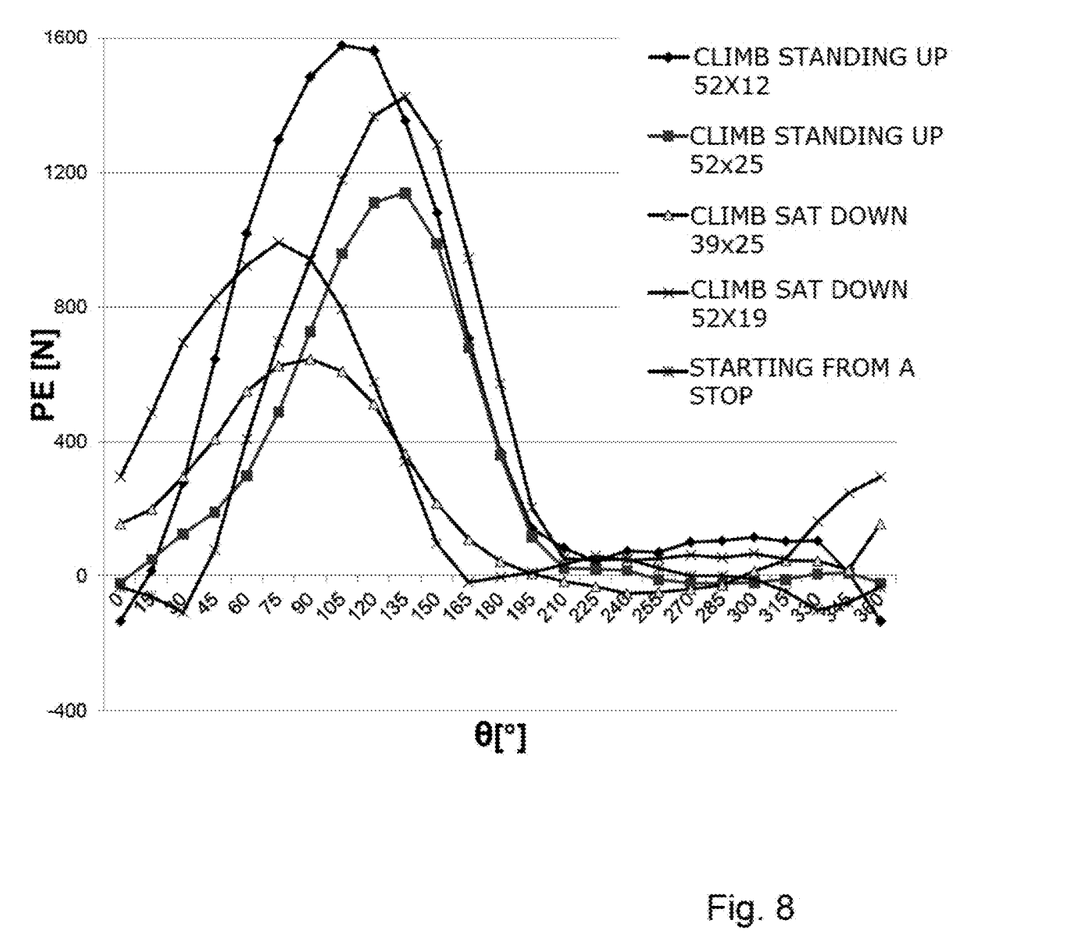
FIG. 8 is a Cartesian graph of the component of the load imparted by the cyclist on the right crank arm useful for the rotation of the toothed crown (i.e. the useful component of the force applied to the right crank arm) as a function of the angle of rotation of the right crank arm, in different reference operating conditions.

FIG. 8 is a Cartesian graph that illustrates the results obtained by the Applicant. The five curves correspond to the five aforementioned reference operating conditions.

The Applicant has considered the operating condition of "starting from a stop" as preferred reference condition given that it is a condition that always occurs and has verified that the useful component PE of the force applied to the right crank arm 30 is maximum when the right crank arm 30 reaches a crank arm angle θ equal to about 135°.

Figure 9:
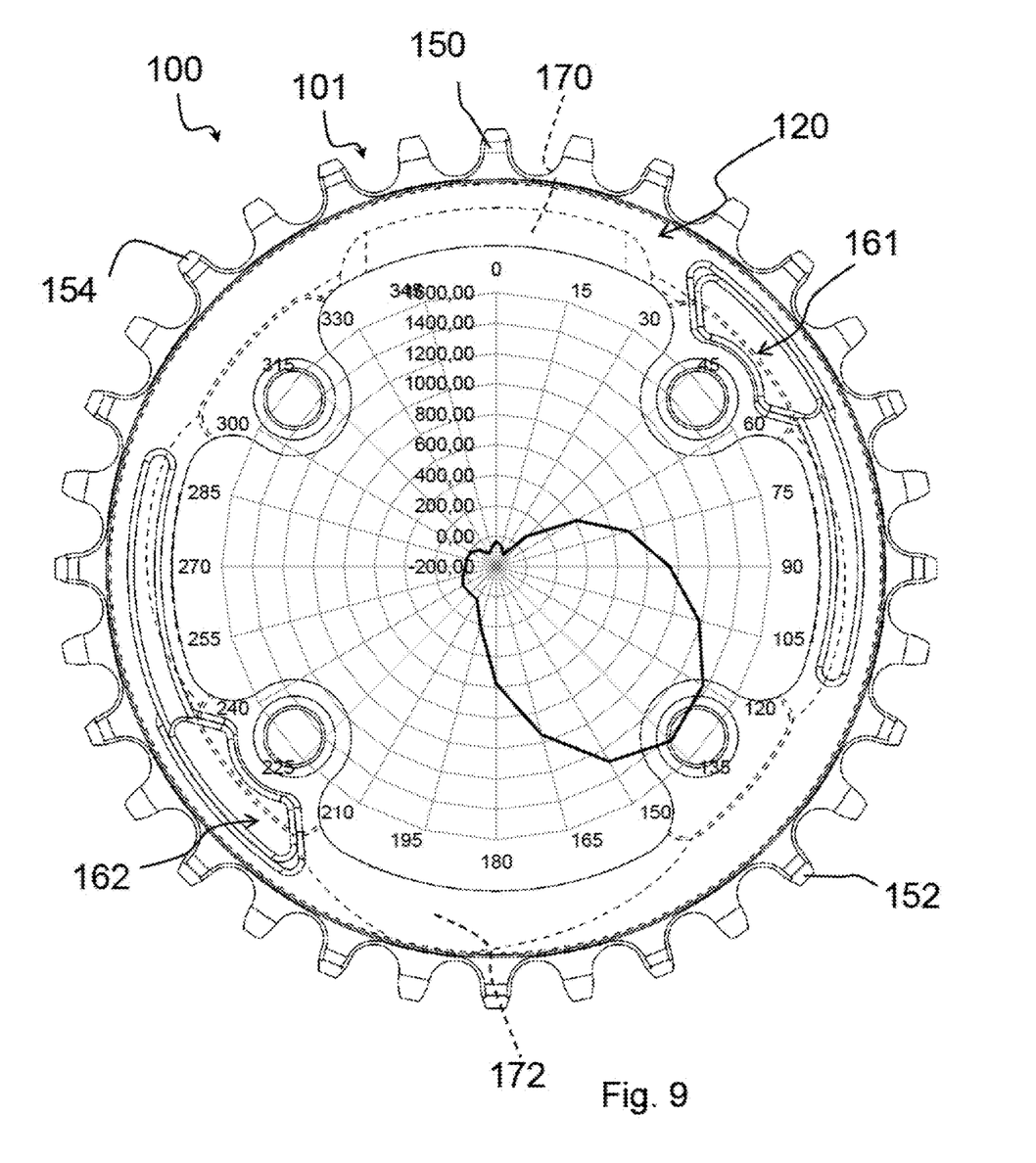
FIG. 9 is a polar diagram of the useful component of FIG. 8 as a function of the angle of rotation of the right crank arm, in the specific operating condition of "starting from a stop", such a figure also showing a schematic rear view of the toothed crown of FIG. 2.

FIG. 9 is a polar diagram of the useful component PE of FIG. 8 as a function of the crank arm angle θ, in the operating condition of "starting from a stop".

FIG. 9 also shows a schematic rear view of the toothed crown 100, with the thirteenth tooth 152 oriented at the crank arm angle θ of 135°.

The Applicant has analyzed the axial deformations which the toothed crown 100 is subjected to by applying to all of the teeth 111 of the toothed crown 100 an axial load equal to the measured maximum value of the aforementioned useful component PE.

In order to define the lightening recesses on the axially inner surface 120 of the toothed crown 100 of the invention of FIGS. 2-6, 7a and 7b, the Applicant has carried out comparative tests with different toothed crowns having different lightening recesses on their axially inner surface.

The Applicant has thus found that the toothed crown 100 described above has a geometry and position for the lightening recesses on the axially inner surface thereof such that, at the teeth 111 most stressed by the chain when the right crank arm is most stressed by the cyclist, there is a lateral deformation substantially equal to that of a hypothetical toothed crown free from lightening recesses on the same surface.

A second preferred embodiment of the toothed crown 100 of the invention is illustrated in FIG. 10, in which elements structurally or functionally equivalent to those already described with reference to the first embodiment are indicated with the same reference numeral.

In this second preferred embodiment, the teeth 111 of the toothed crown 100 are 34.

The toothed crown 100 of FIG. 10 differs from the toothed crown 100 of FIGS. 2-6, 7a and 7b substantially only in the fifth and sixth lightening recesses 261 and 262, as well as in the number of teeth 111.

Each of the fifth and sixth lightening recesses 261, 262 comprises, in particular, a first recess portion 261a, 262a arranged in a radially outer position with respect to the respective coupling portion 160b', 160b" and a second recess portion 261b, 262b that extends from the first recess portion 261a, 262a towards the other coupling portion 160a', 160a" of the respective pair of coupling portions 160a', 160a", 160b', 160b".

The first recess portion 261a, 262a is substantially analogous to the first recess portion 161a, 162a of the toothed crown 100 of FIGS. 2-6, 7a and 7b.

The second recess portion 261b, 262b, on the other hand, comprises a third recess portion 261c, 262c.

In the non-limiting example illustrated, the third recess portion 261c, 262c has a radial extension shorter than that of the second recess portion 261b, 262b.

Furthermore, the third recess portion 261c, 262c has an axial depth greater than that of the second recess portion 261b, 262b and, preferably, smaller than that of the first recess portion 261a, 262a.

Also in the embodiment of FIG. 10, the first angular portion 141 and the second angular portion 142 extend circumferentially between two delimiting planes K and L passing through the rotation axis O and inclined with respect to the reference plane R respectively by a first angle (X1) comprised between about 21° and about 27°, the extreme values being included, and by a second angle (X2) comprised between about 67° and about 73°, the extreme values being included, respectively, such angles (X1, X2) being measured on the axially outer surface of the toothed crown 100 moving angularly in the clockwise direction from the reference plane R. For example, in this embodiment the first angle (X1) can be equal to about 23° (for example equal to 22.9°) or to about 24° and the second angle (X2) can be equal to about 70°.

Of course, those skilled in the art can bring numerous modifications and variants to the present invention, in order to satisfy specific and contingent requirements, all of these modifications and variants being within the scope of protection defined by the following claims.

What is claimed is:

1. A toothed crown for a bicycle crankset, comprising an annular body extending about a rotation axis, a plurality of teeth that extend from said annular body along respective radially outer directions, and a plurality of coupling portions for coupling with a bicycle right crank arm and that extend from said annular body on an opposite side to said plurality of teeth, said annular body comprising:
an axially inner surface;
an axially outer surface;
a reference plane on which said rotation axis lies and a longitudinal axis of said right crank arm is intended to lie when said right crank arm is coupled with said annular body at said plurality of coupling portions and at said axially outer surface;

the annular body having a maximum axial thickness equal to a distance between two main planes parallel to each other and orthogonal to said reference plane, said maximum axial thickness being defined at at least one first angular portion of said annular body;

wherein said at least one first angular portion of said annular body comprises a first lightening recess formed on said axially outer surface, wherein said at least one first angular portion extends circumferentially between a first delimiting plane and a second delimiting planes that pass through said rotation axis, the first delimiting plane is inclined with respect to said reference plane by a first angle of between 21° and 27°, and the second delimiting plane is inclined with respect to said reference plane by a second angle between 67° and 73°, wherein said first angle and said second angle are measured on said axially outer surface moving angularly in a clockwise direction from said reference plane.

2. A toothed crown according to claim 1, wherein said at least one first angular portion is free from lightening recesses on said axially inner surface.

3. The toothed crown according to claim 2, wherein a second angular portion of said annular body comprises a second lightening recess formed on said axially outer surface, wherein said second angular portion is diametrically opposite to said at least one first angular portion with respect to said rotation axis.

4. The toothed crown according to claim 3, wherein said second angular portion is free from lightening recesses on said axially inner surface.

5. The toothed crown according to claim 3, wherein the number of said plurality of teeth is 28 to 44.

6. The toothed crown according to claim 3, wherein a first tooth is arranged substantially astride of, or in close proximity to, said reference plane, a thirteenth tooth and a twenty-ninth tooth are arranged between said two delimiting planes, the thirteenth and the twenty-ninth tooth being counted on said axially outer surface moving circumferentially in a counter-clockwise direction from said first tooth.

7. The toothed crown according to claim 3, wherein said plurality of coupling portions comprises two pairs of coupling portions symmetrically arranged on opposite sides with respect to said reference plane.

8. A toothed crown according to claim 1, wherein a second angular portion of said annular body comprises a second lightening recess formed on said axially outer surface, wherein said second angular portion is diametrically opposite to said at least one first angular portion with respect to said rotation axis.

9. A toothed crown according to claim 8, wherein said second angular portion is free from lightening recesses on said axially inner surface.

10. A toothed crown according to claim 1, wherein the number of said plurality of teeth is 28 to 44.

11. A toothed crown according to claim 10, wherein a first tooth is arranged substantially astride of, or in close proximity to, said reference plane, a thirteenth tooth and a twenty-ninth tooth are arranged between said two delimiting planes, the thirteenth and the twenty-ninth tooth being counted on said axially outer surface moving circumferentially in a counter-clockwise direction from said first tooth.

12. A toothed crown according to claim 1, wherein said plurality of coupling portions comprises two pairs of coupling portions symmetrically arranged on opposite sides with respect to said reference plane.

13. A toothed crown according to claim 12, wherein a first coupling portion of a first pair of said two pairs of coupling portions is arranged at said at least one first angular portion.

14. A toothed crown according to claim 13, wherein a second angular portion of said annular body comprises a second lightening recess formed on said axially outer surface, wherein said second angular portion is diametrically opposite to said at least one first angular portion with respect to said rotation axis, wherein a first coupling portion of a second pair of said two pairs of coupling portions is arranged at said second angular portion.

15. A toothed crown according to claim 14, wherein the annular body comprises, at a second coupling portion of said first pair of said two pairs of coupling portions and at a second coupling portion of said second pair of said two pairs of coupling portions, a third and a fourth lightening recess, respectively, formed on said axially outer surface.

16. A toothed crown according to claim 15, wherein the annular body comprises, at said second coupling portions, respectively a fifth and a sixth lightening recess formed on said axially inner surface.

17. A toothed crown according to claim 16, wherein each of said fifth and sixth lightening recesses comprises a first recess portion arranged in a radially outer position with respect to the respective second coupling portion and a second recess portion that extends from said first recess portion towards the first coupling portion of the respective pair of said two pairs of coupling portions.

18. A toothed crown according to claim 17, wherein said second recess portion has a radial extension shorter than that of said first recess portion.

19. A toothed crown according to claim 17, wherein said second recess portion has an axial depth shorter than that of said first recess portion.

20. A toothed crown according to claim 1, wherein the annular body comprises a plurality of depressions formed on said axially outer surface, each of said plurality of depressions being arranged between two respective circumferentially consecutive coupling portions and extending asymmetrically with respect to a radial plane angularly equidistant from said two circumferentially consecutive coupling portions.

* * * * *